United States Patent [19]

Mitchell, Jr.

[11] Patent Number: 5,474,033
[45] Date of Patent: Dec. 12, 1995

[54] ANIMAL TEACHING/AMUSEMENT DEVICE

[76] Inventor: Robert K. Mitchell, Jr., Rte. 8, Box 1316A, Waco, Tex. 76705

[21] Appl. No.: 238,645
[22] Filed: May 5, 1994
[51] Int. Cl.$^6$ .......................... A01K 27/00; A01K 15/02
[52] U.S. Cl. .......................... 119/860; 119/858; 119/709; 119/905
[58] Field of Search .................. 119/708, 709, 119/710, 711, 792, 794, 860, 905, 858

[56] References Cited

U.S. PATENT DOCUMENTS 4,413,589  11/1983  Bielen, Jr. et al. .................. 119/792
5,038,717  8/1991  Bent .................. 119/905 X

FOREIGN PATENT DOCUMENTS 2740029  3/1979  Germany .................. 119/710
2114864  9/1983  United Kingdom .................. 119/794

Primary Examiner—Robert P. Swiatek
Attorney, Agent, or Firm—Falk, Vestal & Fish; Tom R. Vestal

[57] ABSTRACT

A device for amusing animals and teaching animals not to chew on undesirable objects such a furniture and clothing comprises a chewing device suspended from the neck of the animal. The animal will choose the suspended device to chew. The chewing device may be flavored. Medication may also be administered through the device.

7 Claims, 1 Drawing Sheet

ANIMAL TEACHING/AMUSEMENT DEVICE

Young domesticated animals, especially young dogs, have short attention spans and, consequently, become bored easily. Such animals also have a high degree of curiosity and have a tendency to explore their surroundings and generally "get into things". Young dogs, left to their own, therefore can create havoc in their surroundings, given the opportunity to do so.

A number of chewing devices for animals have been developed. These chewing devices have been used for a dual purpose of providing the animal with exercise and amusement as well as therapeutic massaging of the gingiva surrounding the animal's teeth. Loose particles of food are also removed in the process. Examples of such devices can be found in the following U.S. Pat. Nos.: 5,263,346; 4,802,444; D338,289; 5,215,038; 5,186,124; 5,174,243. Chewing devices of these types utilize rawhide sections, combinations of cotton and sisal materials, nylon and polyurethane polymeric materials. The latter, especially, can incorporated flavorings especially suited for the animal. The chewing devices may also have protuberances especially for massaging the gingival areas of the animal's mouth.

The exercise and amusement toy described in U.S. Pat. No. 5,111,171 includes a reinforced rubber tube having a sponge rubber stuffing attached to a rope. The rope is attached to a tether which is suspended from a mounting bracket, ceiling, tree limb, or the like so that the body can swing freely when struck by the animal. The tether also includes a resilient means that provides elastic resistance to the pulling of the animal in use.

BRIEF DESCRIPTION OF THE PRESENT INVENTION

The present invention is directed to an apparatus which will provide an animal such as a canine with a chewing device when the urge strikes them. It is intended to provide the chewing device in a manner that the device is with the animal constantly, providing the animal with an alternative chewing release than, e.g., the animals owner's furniture, paper, shoes, children's toys, and the like. The advantage of the present invention over the described toys above is that the chewing device is always with the animal so that the animal can chew on the chewing device rather than an alternate which would only bring upon the owner and the animal grief because of unwanted destruction of the owner's articles.

In the invention herein, a chew toy of the owner's selection is attached to a collar or harness worn by the animal in a manner that the chew toy is suspended within reach of the mouth of the animal. When the animal has an urge to bite or chew the suspended chew toy, being ever present before the animal, will be chosen rather than the animal owner's or other's belongings. In this manner the attention of the young animal can be diverted from destructive activities. Further, the chew toy of the present invention can be used as a teaching device by rewarding the animal when the animal focuses on the chew toy and correcting the animal when it chooses another article, instead.

BRIEF DESCRIPTION OF THE DRAWINGS

The chew device of the present invention can be understood by referencing the following figures, in which.

DETAILED DESCRIPTION OF THE INVENTION

Figure 1:
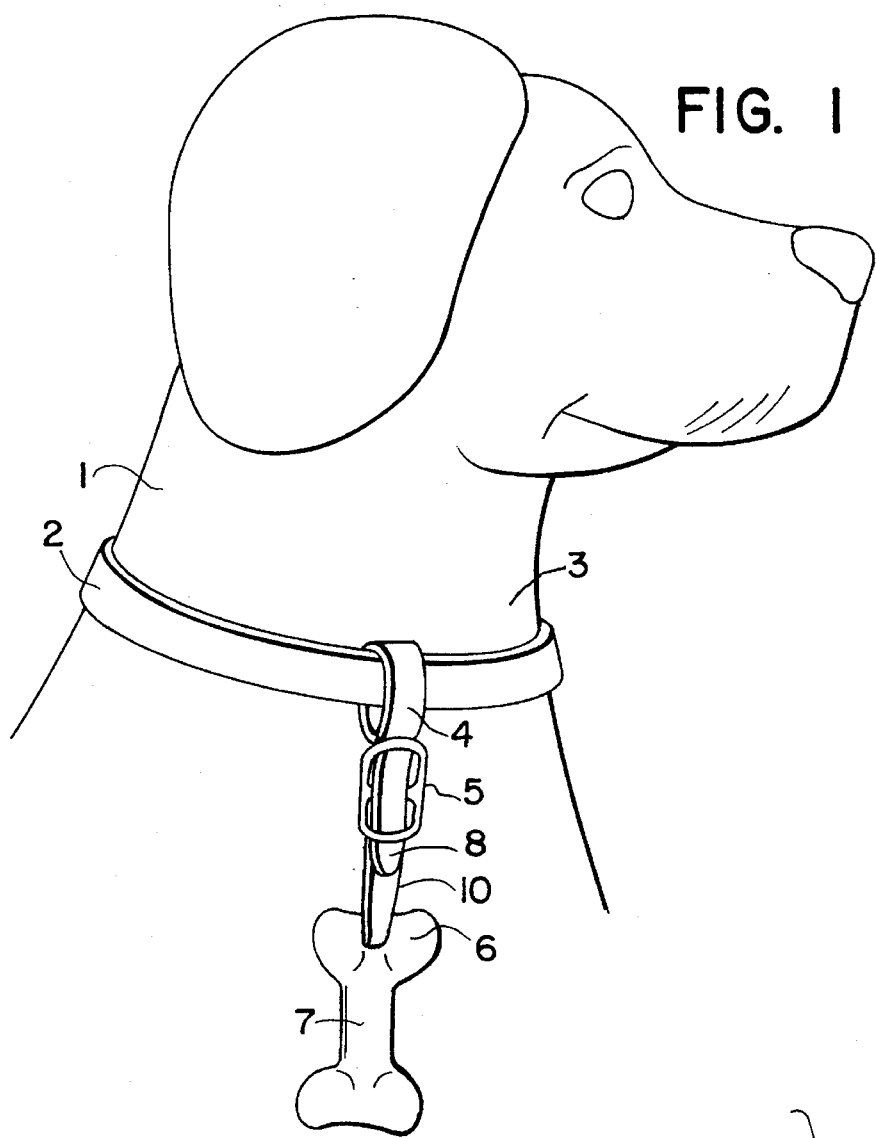
FIG. 1 depicts a dog with the invention herein suspended about the neck.

In the invention described in FIG. 1, the bust 1 of a canine is shown wearing a collar Z about its neck 3. Collar Z could just as well be a harness. A suspension strap 4 is looped about the collar Z and through a buckle device 5, ending in tip 8. The other end 10 of the strap 4 is connected in a conventional manner at point 6 of a chew device 1. It is recognized that a number of conventional attaching devices may be used rather than the buckle attachment, cost and convenience being determinative of the type of attachment utilized.

Figure 2:
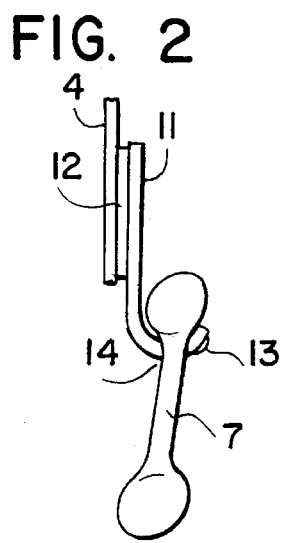
FIG. 2 depicts a "break-away" feature of the invention utilizing velcro.

In FIG. 2, the strap 4 has a "Velcro" pad 12 attached to its end. "Velcro" is a trademark for a hook and loop fastener. The corresponding "Velcro" pad is attached to a strap 11, the other end of which is threaded through an opening 14 in the chew device 7 and formed into a knot 13.

Figure 3:
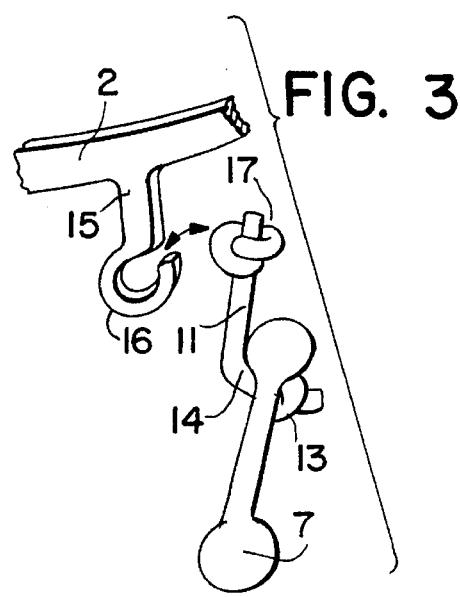
FIG. 3 depicts another replacement feature of the invention.

In FIG. 3, the collar Z has appendaged to the collar a suspension strap 15 appendaged. The end of appendage strap 15 is formed into an eyelet 16 which may be closed or partially open as shown. Strap 11 may be a cord or rope having a knot 17 tied in one end. The other end 13 is passed through an opening in the chew device 7 and tied into a knot.

In use, the chewable device is placed around the animal as shown and allowed to hang from the animal's neck. The suspending strap should be long enough for the animal to comfortably reach the chew device 7 when the urge comes upon the animal, but not so long that the animal will trip over the chew device. Further, the suspending means should not be so strong that the safety of the animal would be jeopardized if it became caught. The suspending means should not be so weak that the animal will easily remove the chew device from its collar support. The proper suspension can be determined according to the type and size animal.

The removable sections depicted in FIGS. 2 and 3 are especially useful as replacement parts. When an animal has used up the chew device, another chew device can be attached in place of the used device.

The strap material may comprise nylon or similar webbing, leather, "bungee" cord, elastic band material, synthetic or natural fiber, rope or cord, plastic, wire or rawhide.

The chew device can be similar to the devices described above in the prior art section. Flavorings can be included in the device to entice the animal to bite the device rather than an undesired object. Training scents may also be used selectively by appropriate replacement chew devices.

Medicines may also be administered in this manner. A properly dosed chew device can be alternated as necessary or as described by a veterinarian.

It is recognized that this invention can take several forms and still be within the teachings herein. Although the present invention and its advantages have been described in detail, it should be understood that various changes, substitutions and alterations can be made herein without departing from the spirit and scope of the invention as defined by the appended claims.

What is claimed is:

1. A method of training an animal such as a dog from chewing undesirable objects comprising the steps of suspending from a collar or harness attachment a single strap having a chew device for the animal connected to one end and allowing the animal to reach said chew device while connected to said collar or harness attachment, the chew device and strap being nondestructively detachable from the collar or harness upon exertion of a determined pull force along the single strap.

2. The method of claim 1, further comprising the step of flavoring the chew device prior to suspending it from the neck of the animal.

3. The method of claim 2, wherein the flavoring step includes adding medication for the animal.

4. An attachment to the collar or harness of an animal to detract the animal from biting or chewing undesired objects, said attachment comprising a single strap having a chew device for the animal connected to one end, the other end connected to the collar or harness; said other end having a means for nondestructively detaching said strap upon exertion of a predetermined pull force upon the strap.

5. The attachment of claim 4, wherein the other end is looped around the collar or harness and through a buckle, whereby the suspended length of the attachment can be adjusted to the animal.

6. The attachment of claim 4, wherein said means for detaching said one end from said other end comprises corresponding hook and loop fastener sections.

7. The attachment of claim 4, wherein said means for detaching said one end from said other end comprises an eyelet on said collar or harness and a rope having a knot at said other end for engaging said eyelet, the one end of the rope being attached to the chew device.

* * * * *